United States Patent Office 3,016,610
Patented Jan. 16, 1962

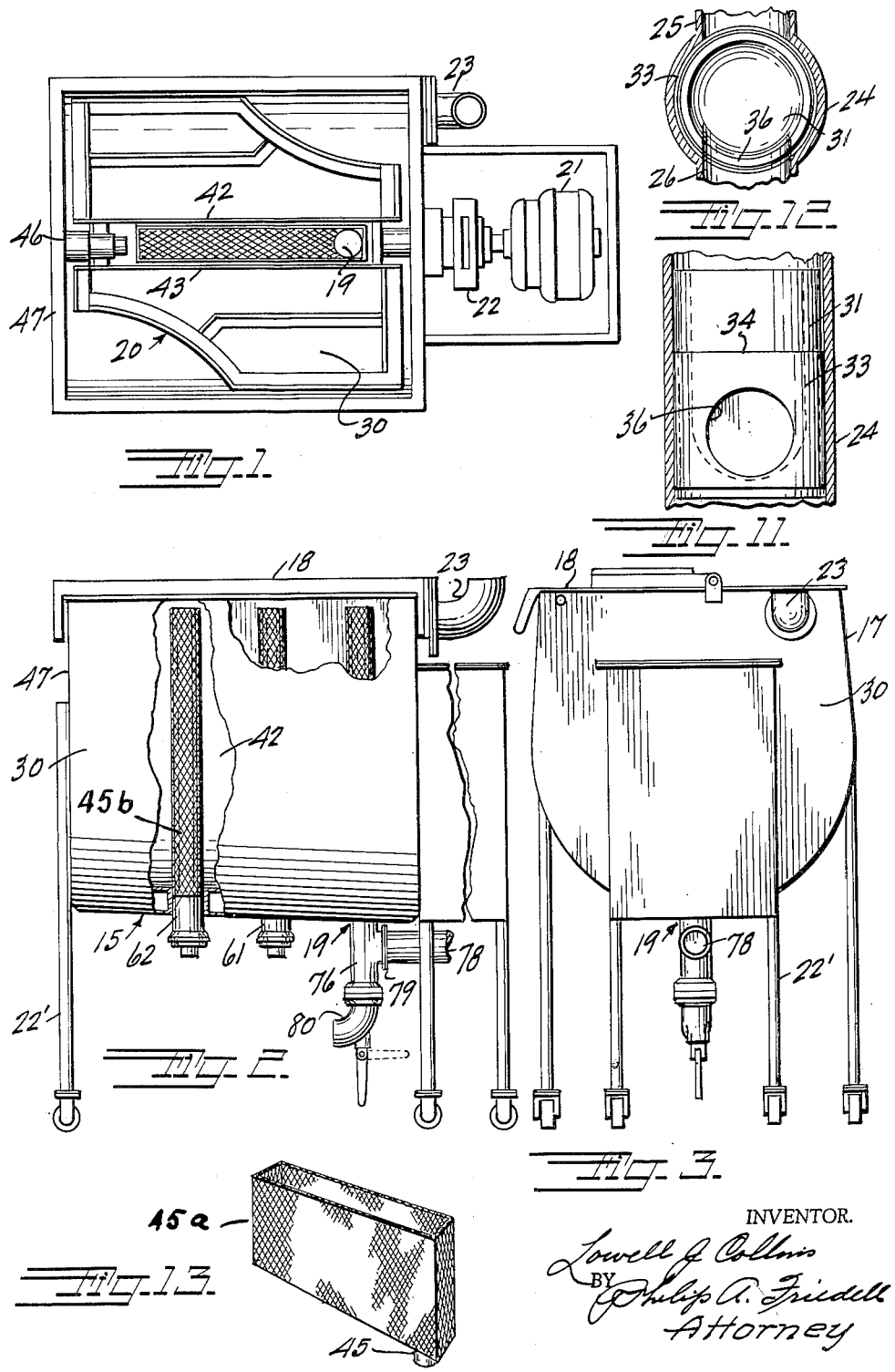

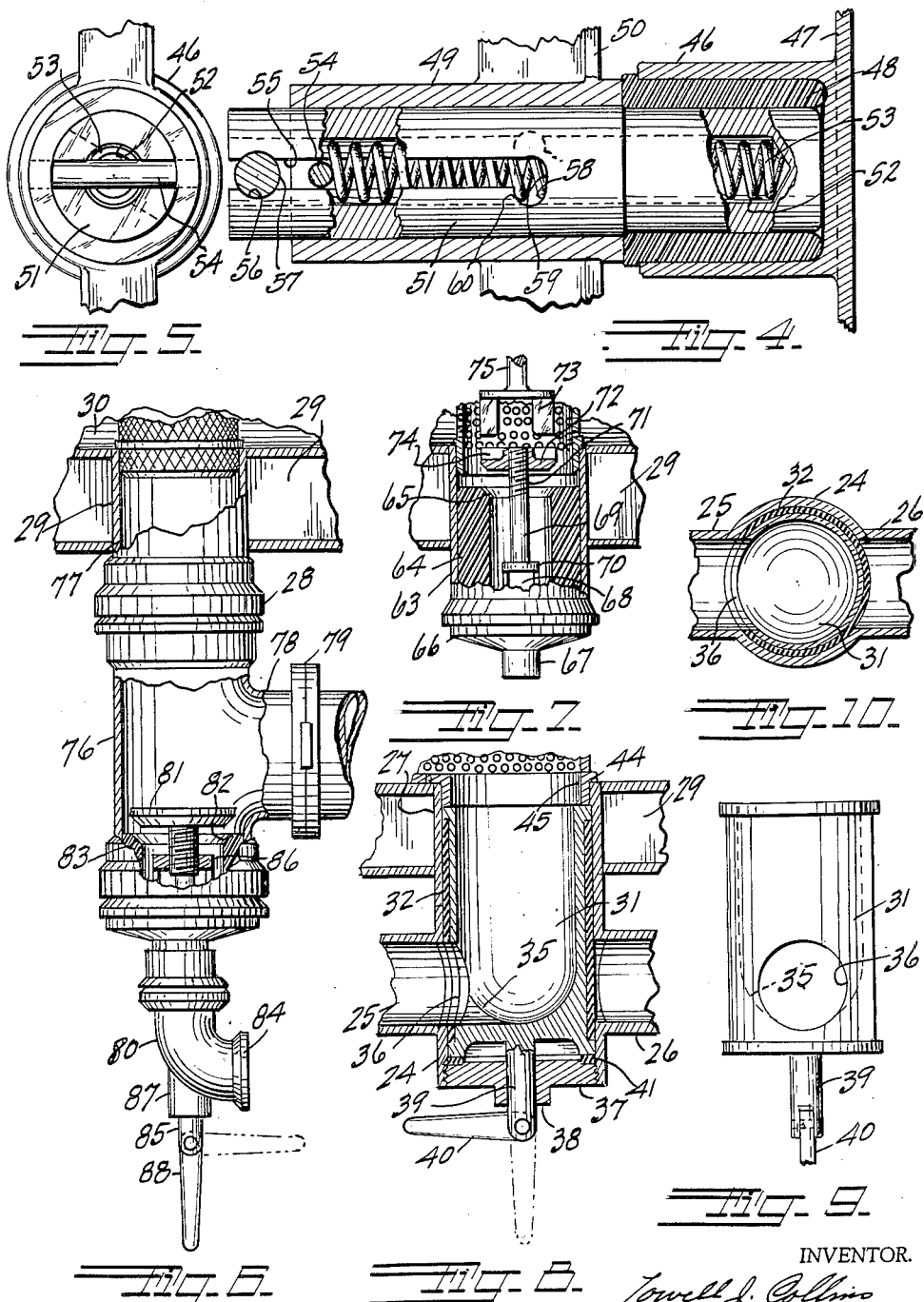

3,016,610
COMBINATION CURD DRAINER AND COTTAGE CHEESE MIXER
Lowell J. Collins, 938 61st St., Oakland 8, Calif.
Filed Feb. 23, 1960, Ser. No. 10,142
8 Claims. (Cl. 31—48)

This invention relates to improvements in the manufacture of cottage cheese, and particularly to apparatus which eliminates certain steps of the conventional process, thereby speeding up production with consequent reduction in time and labor, and most important, greatly reducing the exposure of the curd to air thus minimizing the harmful bacteria count and greatly increasing the keeping qualities of the cottage cheese, and which is accomplished by eliminating the conventional intermediate step draining apparatus and transferring the curd with its final wash water directly to my combination drainer and mixer where the curd is drained and mixed with cream and any other desired ingredients to form cottage cheese, and which is drained directly from this combination apparatus to the dispensing apparatus.

As is well known, in the conventional process of making cottage cheese, the curd is washed, the curd with its wash water is transferred to a drainer where the water is drained away, with the curd exposed to air to be exposed to the influx of harmful bacteria from the contact air, also causing an increase in temperature of the curd particularly on the surface and in which increased temperature the bacteria become far more active, the curd being exposed for a considerable length of time during draining and transfer to the mixer, and which transfer is usually carried out in open containers which are hoisted as by elevator and dumped into the mixer.

My new apparatus eliminates all of that operation and exposure mentioned in the preceding paragraph, there being only one transfer, from the washing vats to the mixer, thus maintaining the proper temperature, with an absolute minimum exposure to air, and which is the secret of producing the most tasty cottage cheese with the best keeping qualities.

The objects and advantages of the invention are as follows:

First, to provide a combination curd drainer and cottage cheese mixer, for diminishing exposure of the curd to air and eliminating transfer of the washed curd.

Second, to provide apparatus as defined in the preceding object, in which the draining equipment is applicable and removable at will while the agitator is in position for operation in the mixing bowl.

Third, to provide apparatus as outlined in which operation of the agitator merely requires withdrawal of the draining equipment for immediate processing of the drained curd to form the cottage cheese.

Fourth, to provide apparatus as outlined with an agitator which permits introduction of the draining equipment while the agitator is in operative position and still providing retractable shafts for removal of the agitator at will.

Fifth, to provide apparatus as outlined with discharge valves selectively adjustable for discharge of drain water from the curd, and discharge of the cottage cheese to dispensing apparatus.

In describing the invention, reference will be had to the accompanying drawings, in which:

FIG. 1 is a top plan view of my invention.
FIG. 2 is a front elevation of the invention and showing the cover closed, and draining apparatus modified.
FIG. 3 is a side or drive end elevation with the front portion of the double hinged cover open.
FIG. 4 is a longitudinal view of the retractive shaft for the idle end of the agitator, and partly shown in section.
FIG. 5 is an end elevation of FIG. 4.
FIG. 6 is a side elevation of one type of selective drain water discharge and cottage cheese discharge valve, partly shown in section.
FIG. 7 is a sectional elevation through one of the drainage valves.
FIG. 8 is a sectional elevation through a modification of the selective drain water discharge and cottage cheese discharge valve.
FIG. 9 is a front elevation of the valve bowl of the valve illustrated in FIG. 8.
FIG. 10 is a top plan view of FIG. 9 with the bottom of the mixer bowl removed.
FIG. 11 illustrates a modification of the sealing means for the valve illustrated in FIGS. 8, 9 and 10.
FIG. 12 is a top plan view of FIG. 11.
FIG. 13 is an elevational perspective of the unitary type of removable drain illustrated in FIG. 1.

The mixing bowl may be of any suitable form and construction, and is illustrated as being of the conventional type, the lower end being substantially semi-cylindrical in cross-section and thence slightly tapering inwardly to the top as indicated at 17, and provided with a cover 18, and having a single outlet at 19 for discharge of the cottage cheese, the bottom of the bowl being tapered downwardly to that outlet for suitable drainage. A suitable agitator 20 is driven by suitable power means, as the motor 21, the bowl being supported at the most suitable elevation as indicated by the legs 22. The drained curd is normally dumped into the bowl from containers, the curd having considerable exposure to air and being subjected throughout during the transfers and dumping periods to air-carried harmful bacteria and which is almost completely eliminated by the alterations in the mixing apparatus and change in process, as disclosed in the following description of the invention.

The invention may consist of either, an attachment for existing mixers, or as a new type of mixer, the type illustrated in FIGS. 1 and 13 being particularly suited as an attachment as well as for a new type unit, that in FIG. 2 being only suitable for new units because of the alterations and additions to the bowl, and requiring a plurality of discharge outlets and valves.

The conventional mixer bowl has a single valve controlled discharge assembly for the mixed cottage cheese at 19 and has a retractable drive shaft including the retractive means indicated at 22 to permit removal of the agitator for cleaning and sterilization of both, agitator and bowl. The agitator has a tubular shaft terminating in a retractable tail shaft for operation of which the tubular shaft is required.

This conventional type is fully disclosed in my Patent Number 2,846,199, issued August 5, 1958, and for conversion to my combination sequential drainer and mixer merely requires the substitution of a two-way valve at 19 for selectively discharging the drain water and the cottage cheese, and a new agitator 42, 43 with retractable tail shaft as illustrated in FIG. 1, and the strainer 45a illustrated in FIG. 13. The intake 23 for the curd with its wash water is not essential as the curd can be discharged into the top of the bowl.

As an attachment, it is merely necessary to substitute a suitable two-way valve such as that illustrated in FIGS. 8, 9 and 10 for the conventional discharge valve at 19, and which valve consists of a cylindrical housing 24 having lateral outlets 25 and 26 and which may be connected to the discharge housing 27 by suitable means such as a tri-clamp ferrule 28 or the like if the housing 27 is not sufficiently long, the housing passing through the refrigerating jacket 29 of the bowl 30. The valve bowl 31 is slidable and rotatable in the housing 24—27, and is provided with annular sealing means 32 of suitable resilient material such as live rubber, synthetic rubber or a suitable resilient plastic material, or the sealing means may consist of a spring band of non-corrosive metal or plastic, as indicated at 33 in FIGS. 11 and 12, the band being maintained against rotation on the valve bowl by suitable means such as a pin 34, the bore of the valve bowl terminating in a semi-spherical bottom as indicated at 35 and having a single radial opening 36 the bottom of which is coincident with the deepest portion of the bore, thus providing the smoothest possible interior for free flow and easy cleaning and sterilization.

A cap or cover 37 is suitably secured at the lower end of the housing 24 and has an axial bearing 38 for the valve shaft 39 which is fixed to or integral with the bottom of the valve bowl, and a handle 40 is pivoted to the lower end of this shaft with no portion having a diameter in excess of that of the valve shaft, to permit the valve shaft with its operating handle to be withdrawn through the bearing. Suitable sealing means 41 is provided between the bottom of the valve bowl and the cap 37.

When the valve bowl is turned to one position, the drained water from the curd will discharge through one conduit 25, and when turned to the other position will discharge the cottage cheese through the other conduit 26, and when turned to an intermediate position will close both passages as will be required during the cottage cheese mixing process. By removing the cap, the valve bowl can be withdrawn for cleaning, and the cap can be slipped off the shaft and handle, a rapid and simple operation for cleaning and sterilization.

The attachment also requires the substitution of a modified agitator, the agitator being formed identically with the exception of the substitution of spaced spreader bars or rods 42 and 43 between which the straining means can be inserted, for the conventional tubular shaft, thus making it unnecessary to offset the discharge from the strainer 45a to seat in the discharge outlet sleeve 44 of the strainer outlet as indicated at 45.

Since the previous types of retractive tail shafts are dependent on the tubular type of shaft, a new type of retractive shaft is required and is illustrated in FIGS. 4 and 5, the internal hub 46 integral with the end wall 47 of the mixer bowl, and the bearing 48 of a suitable plastic material being conventional and requiring no change, the changes being provided in the hub 49 of the agitator 50 and retractive shaft 51, which shaft has an axial bore 52 forming a spring housing for the compression spring 53 which is retained under initial compression by a pin 54 which is fixed in the hub 49 and slidable in the longitudinal slot 55. An enlarged diametric bore 56 is provided for use of a rod 57 for manually retracting the shaft for release of the agitator. A transverse angle slot 58 is provided for locking the shaft in retracted position. As the shaft is retracted to where the pin 54 engages the back wall 59 of the slot 58, the shaft is merely turned to where the pin will engage the front wall 60 of the slot. When the agitator is replaced, it is only necessary to turn the shaft back for release, the spring urging the shaft back into the bearing.

The strainer as illustrated in FIG. 13 is made long and narrow to pass readily between the spacers 42 and 43 and may either be formed of non-corrosive metal or a suitable plastic material and provided with closely spaced drain passages throughout including the bottom, or may be formed of screen material, which obviously is not as satisfactory because of the clinging of the curd and more difficult cleaning and sterilization, and this strainer is provided with a discharge outlet 45 for the drain water and which discharge outlet fits in the discharge outlet sleeve 44 in the discharge outlet assembly 19 of the mixer bowl, as indicated in FIG. 8.

A modification of the invention and one which is only suitable for new construction, consists of the conventional mixer bowl with the modified agitator, but having a plurality of additional cylindrical strainers 45b mounted in discharge outlets as indicated at 61 and 62 in FIG. 2, the outlet at 19 having a valve for selective discharge of wash water and for mixed cottage cheese, the others merely having a valve for draining the wash water from the curd, a suitable valve being disclosed in FIG. 7 which includes a cylindrical housing 63 in which a valve chamber 64 is slidable, this valve chamber having a valve seat 65 which is retained in position by the cap 66 and which cap is provided with a discharge pipe 67 having diametric passages 68 and having a shaft 69 fixed to the upper end as indicated at 70 and which shaft is threaded at its upper end as indicated at 71, and on which threaded end the valve 72 is adjustable, the valve being adjusted to open and closed positions by a modified screw driver type of implement having depending plates 73 to engage in slots 74 in the valve, the valve tool 75 being operated through the cylindrical strainers and which strainers are preferably formed of non-corrosive tubing provided with closely related water passages throughout their extent, though they may be formed of woven screen material.

A modification of the selective water and cottage cheese discharge valve is shown in FIG. 6 and consists of a housing 76 having connection through the bottom of the mixer bowl as indicated at 77, and having a lateral passage 78 for discharge of the cottage cheese and which discharge is controlled by a valve 79, and also having a drain water discharge 80 which is controlled by a valve 81 which seats on the valve seat 82 formed at the upper end of the valve chamber 83 which drains through the passage 84, the valve 81 being adjustable through the medium of the valve shaft 85 which is threaded at its upper end with the threaded portion operating in the threaded spider 86, the shaft extending down through the hub 87 and terminating in a pivoted handle 88 which is retractable through the hub with the shaft. For draining the curd, valve 79 is closed and valve 81 opened, and for discharging the cottage cheese, valve 81 is closed and valve 79 opened. The intake for the curd for its wash water is indicated at 23 and is located near the top of the mixer bowl.

I claim:

1. An attachment for converting a cottage cheese mixer having a bowl having a top and a bottom and having a discharge outlet in the bottom, and having an agitator having a hub at each end, and driving means therefor, and having angularly spaced blades having arms connecting the hubs, and having parallel connecting members spaced from the axis of the hubs, into a combination sequential drainer for washed curd and cottage cheese mixer; comprising a strainer having an upper end and a lower end, with the upper end extending to a plane adjacent the plane of the top, and the lower end removably mounted in communication with said discharge outlet, and a valve for said discharge outlet and adjustable to three positions, in the first of which the wash water drained from the curd is discharged to waste, in the second of which the discharge outlet is closed for retaining the drained curd for mixing to produce cottage cheese, and in the third of which the discharge outlet is open for discharge of the cottage cheese for packaging, with the strainer being removable at will from between the angularly spaced blades and parallel members and body of drained curd for freeing the agitator for the mixing operation to produce cottage cheese.

2. An attachment for converting a cottage cheese mixer having a bowl having a top and a bottom and having a discharge outlet in the bottom, and having an agitator having a shaft and driving means therefor, into a combination sequential drainer for washed curd and cottage cheese mixer, comprising a strainer having an upper end and a lower end, with the upper end extending to a plane slightly below said top, and the lower end removably mounted in communication with said discharge outlet, and a valve for said discharge outlet and sequentially adjustable to three positions, in the first of which the wash water from the curd is discharged to waste, in the second of which the discharge outlet is closed for retaining the curd for mixing to produce cottage cheese, and in the third of which the discharge outlet is open for discharge of the cottage cheese for packaging, said strainer being removable at will from the bowl and body of drained curd for freeing the agitator for the mixing operation to produce the cottage cheese, said agitator having a hub at each end, and spaced spacer bars connecting the hubs and functioning as the agitator shaft, with the spacer bars spaced to receive the drain apparatus therebetween for connection to the discharge outlet in the bowl.

3. In combination with a cottage cheese mixer or the like having a bowl having a discharge outlet in the bottom thereof and a valve for said discharge outlet, and an agitator operably mounted in said bowl and including driving means therefor, curd draining means comprising, a strainer having a height substantially equal to the inside depth of the bowl and having its lower end fitting in the discharge outlet and insertable and removable therefrom through access clearance provided through the agitator, with the agitator operable upon removal of the strainer from the drained curd, for producing cottage cheese.

4. In a cottage cheese mixer having a bowl having a top and a bottom and a discharge outlet for cottage cheese in the bottom, an agitator having a hub at each end, and having blades having arms connected to said hubs, curd draining means comprising, a strainer having a lower end in communication with said discharge outlet and having a height substantially equal to the interior height of the bowl for draining the wash water from curd and being withdrawable between the blades from a body of drained curd for freeing the agitator for operation to produce cottage cheese.

5. A structure as defined in claim 4, a valve for said discharge outlet and adjustable to three positions, in one of which the discharge outlet is open to waste, in the second of which the discharge outlet is sealed for retention of the curd for mixing, and in the third of which the discharge outlet is open for discharge of mixed cottage cheese for dispensing.

6. In a cottage cheese mixer having a bowl and supporting means therefor and having a hub at each end of the bowl and having a top and a bottom and a cover for the top, a discharge outlet in the bottom of the bowl, an agitator having a hub at each end and driving means therefor and having spaced blades having arms connecting said hubs; curd draining means for said cottage cheese mixer comprising a strainer having an upper end and a lower end with the lower end removably connected to the discharge outlet and the upper end extending substantially to the top of the bowl and removable at will from betweeen the spaced blades when the agitator is in operative position for freeing the agitator for operation to produce cottage cheese, and a three-way valve for said discharge outlet.

7. Means for converting a cottage cheese mixer having a bowl having a top and a bottom and a cover for the top, and having a cottage cheese discharge outlet in the bottom, and having an agitator having a shaft and driving means for the shaft, into a combination sequential curd drainer and cottage cheese mixer, comprising a strainer having an upper end and a lower end, with the lower end removably connectable at will in communication with said discharge outlet and projecting upwardly with the upper end in clearing relation to the underside of said cover, and a three-way valve for said discharge outlet and manually adjustable respectively for discharge of water drained from the curd, sealing the discharge outlet for mixing of the curd to produce cottage cheese, and discharge of the cottage cheese, said strainer being readily removable at will from the body of drained curd by vertical retraction, and a washed curd inlet discharging into said bowl beneath said cover, whereby cottage cheese is produced with a minimum exposure to atmosphere and deleterious bacteria carried thereby, said agitator having a hub at each end and spaced spacer bars connecting the hub and spaced to receive the strainer therebetween and functioning as the agitator shaft, and a retractable shaft for each end of said agitator for removal of the agitator at will for cleaning and sterilization.

8. Means for converting a cottage cheese mixer having a bowl having a bottom having a discharge outlet, and having an agitator having a hub at each end and operatively mounted in said bowl and having radially spaced connecting means between said hubs, into a combination sequential curd drainer and cottage cheese mixer, comprising a strainer having a communicating connection with said discharge outlet and extending upwardly between said hubs and removable at will through the agitator from the drained curd for freeing the agitator for the operation of producing cottage cheese.

References Cited in the file of this patent
UNITED STATES PATENTS

| | | |
|---|---|---|
| 1,546,756 | Schulze et al. | July 21, 1925 |
| 1,565,970 | Stanzel | Dec. 15, 1925 |
| 2,536,054 | Harrington | Jan. 2, 1951 |
| 2,846,199 | Collins | Aug. 5, 1958 |